United States Patent
Peng et al.

(10) Patent No.: US 9,062,430 B2
(45) Date of Patent: Jun. 23, 2015

(54) BUFFER UNIT FOR SLEWING PLATFORM OF TAMPING MACHINE

(75) Inventors: Jiwen Peng, Shanghai (CN); Zhiqiang Wu, Shanghai (CN); Weichan Tan, Shanghai (CN); Wei Zhao, Shanghai (CN)

(73) Assignees: Hunan Sany Intelligent Control Equipment Co., Ltd., Changsha, Hunan (CN); Kunshan Sany Mechanical Co., Ltd., Jiangsu (CN)

( * ) Notice: Subject to any disclaimer, the term of this patent is extended or adjusted under 35 U.S.C. 154(b) by 217 days.

(21) Appl. No.: 13/318,282

(22) PCT Filed: Jun. 27, 2011

(86) PCT No.: PCT/CN2011/001057
§ 371 (c)(1),
(2), (4) Date: Jan. 31, 2014

(87) PCT Pub. No.: WO2012/065351
PCT Pub. Date: May 24, 2012

(65) Prior Publication Data
US 2014/0147069 A1    May 29, 2014

(30) Foreign Application Priority Data
Nov. 17, 2010 (CN) ...................... 2010 2 0610860 U

(51) Int. Cl.
*E01C 19/00* (2006.01)
*E02D 3/046* (2006.01)
*E01C 19/34* (2006.01)
*E01C 19/30* (2006.01)
*E02D 3/054* (2006.01)

(52) U.S. Cl.
CPC ............... *E02D 3/046* (2013.01); *E01C 19/34* (2013.01); *E01C 19/30* (2013.01); *E02D 3/054* (2013.01)

(58) Field of Classification Search
CPC ......... E02D 3/046; E02D 3/054; E01C 19/30; E01C 19/34
USPC ..................................... 404/133.05
See application file for complete search history.

(56) References Cited

U.S. PATENT DOCUMENTS

| 5,070,947 A | 12/1991 | Scott et al. | |
| 5,667,020 A * | 9/1997 | Palmer et al. | 172/781 |
| 2010/0155355 A1 * | 6/2010 | Willim | 212/245 |

FOREIGN PATENT DOCUMENTS

| CN | 2143633 Y | 10/1993 |
| CN | 2447384 Y | 9/2001 |
| CN | 2641124 Y | 9/2004 |
| CN | 201485846 U | 5/2010 |

* cited by examiner

*Primary Examiner* — Raymond W Addie
(74) *Attorney, Agent, or Firm* — Ohlandt, Greeley, Ruggiero & Perle, L.L.P.

(57) ABSTRACT

A buffer unit for the slewing platform of the tamping machine, comprising a slewing plafform, a slewing bearing and a chassis, the upper end of the said slewing bearing connects to the slewing plafform and the lower end of said slewing bearing connects to the chassis, the slewing platform can revolve around the chassis 360 degrees, further comprising a annular supporting slab, a hydraulic cylinder and a connecting rod, the annular supporting slab is fixed on the chassis by bolt. The hydraulic cylinder is fitted on the rear end of the central plane of the slewing platform, the piston rod head of the hydraulic cylinder connects to said connecting rod. The connecting rod can touch and support the annular base slab at any point of the direction of 360 degrees rotation when the hydraulic cylinder extends.

15 Claims, 3 Drawing Sheets

BUFFER UNIT FOR SLEWING PLATFORM OF TAMPING MACHINE

FIELD OF THE INVENTION

The present invention relates to a tamping machine, specifically relates to a buffer unit for slewing platform of tamping machine.

BACKGROUND ART

When a tamping machine is running, the pounder falls down, thus generating rebounce to the arm support. To the crawler-type tamping machine, due to its slewing platform connect to the chassis with the slewing bearing, the rebounce would produce impact force to the slewing bearing.

Withal, the Chinese utility model patent CN261124Y provided a crawler-type tamping machine with hydraulic cylinder and solved the above mentioned problem in part. However, its hydraulic cylinder could not touch and support the chassis annular at any point of direction of 360 degrees, and its working position is only forwards, backwards, right and left, which is inconvenient work all-dimensional. Such shortcomings result in the low working effectiveness of the tamping machine.

In order to adapt different problem during the building operations, the tamping machine need to adjust working position as the case, so it's necessary to provide a buffer unit, which could rotate 360 degree all-dimensional, for the crawler-type tamping machine, frees the crawler-type tamping machine from the limitation of the prior working position, and ensures the tamping machine working free from the rough road conditions.

SUMMARY OF THE INVENTION

Aiming at the defect of the prior art, the purpose of the present utility model is to provide a buffer unit for slewing platform of the tamping machine, which comprising a slewing bearing and a chassis, the upper end of the said slewing bearing connects to the slewing platform and the lower end of the said slewing bearing connects to the chassis, the said slewing platform can revolve around the chassis 360 degree, wherein further comprising a annular supporting slab, a hydraulic cylinder and a connecting rod, the said annular supporting slab is fixed on the chassis by bolt. The said hydraulic cylinder is fitted on the rear end of the central plane of the slewing platform, the piston rod head of the hydraulic cylinder connects to the said connecting rod.

The said buffer unit for the slewing platform of the tamping machine, wherein the difference in height between the said slewing platform and the said chassis meets the requirements that the said connecting rod touches and supports the annular supporting slab at any point of direction of 360 degrees rotation when the hydraulic cylinder extend.

The said buffer unit for the slewing platform of the tamping machine, wherein the annular supporting slab is an annular metal plate, the width of the said annular metal plate is longer than the length of the diameter of the said connecting rod.

The said buffer unit for the slewing platform of the tamping machine, wherein the chassis comprises "H" shaped bracket, the said annular supporting slab comprises two retaining plates separately fixed on the two brackets of the said chassis and two active plates separately fixed between two brackets of the said chassis, the four plates are distributed in circular form.

The said buffer unit for the slewing platform of the tamping machine, wherein a groove forms on the internal surface of the said retaining plate, which forms guide rail with two legs of the chassis, so that the active plates could extend in the guide surface to adjust the position to change the radius of the retaining plates.

The said buffer unit for the slewing platform of the tamping machine, wherein the active plate is supported by four legs, the said legs connect to the said chassis with a hinge pin, the said supporting legs could revolve around the said hinge pin.

The said buffer unit for the slewing platform of the tamping machine, wherein the chassis comprises several mounting holes, the bolts which connect to the said active plate and the said chassis are fixed in different mounting hole selectively.

The benefits of the utility model are as following:
1. Stability: the reduction of loading of the hydraulic cylinder acts as dampening effect to the slewing platform and avoids it to tip-over, and acts as protective effect to the slewing bearing, protects it from the frequent impact force, so that increases stability and reliability of the unit.
2. Applicability: The slewing platform could be protected at any working position of 360 degree by configured the annular supporting slab.
3. The hydraulic cylinder is positioned on the chassis instead of on the ground, which ensure the tamping machine working free from the rough road conditions.

BRIEF DESCRIPTION OF THE DRAWINGS

With reference to the following figures for example the detailed description, the other features, objectives and advantages of the utility model will become more obvious.

DETAILED DESCRIPTION OF THE IMPLEMENTING EMBODIMENT

Combining with the drawings and the embodiment, the detailed of the buffer unit for the slewing platform of the tamping machine of the present utility model is as following.

Figure 1:
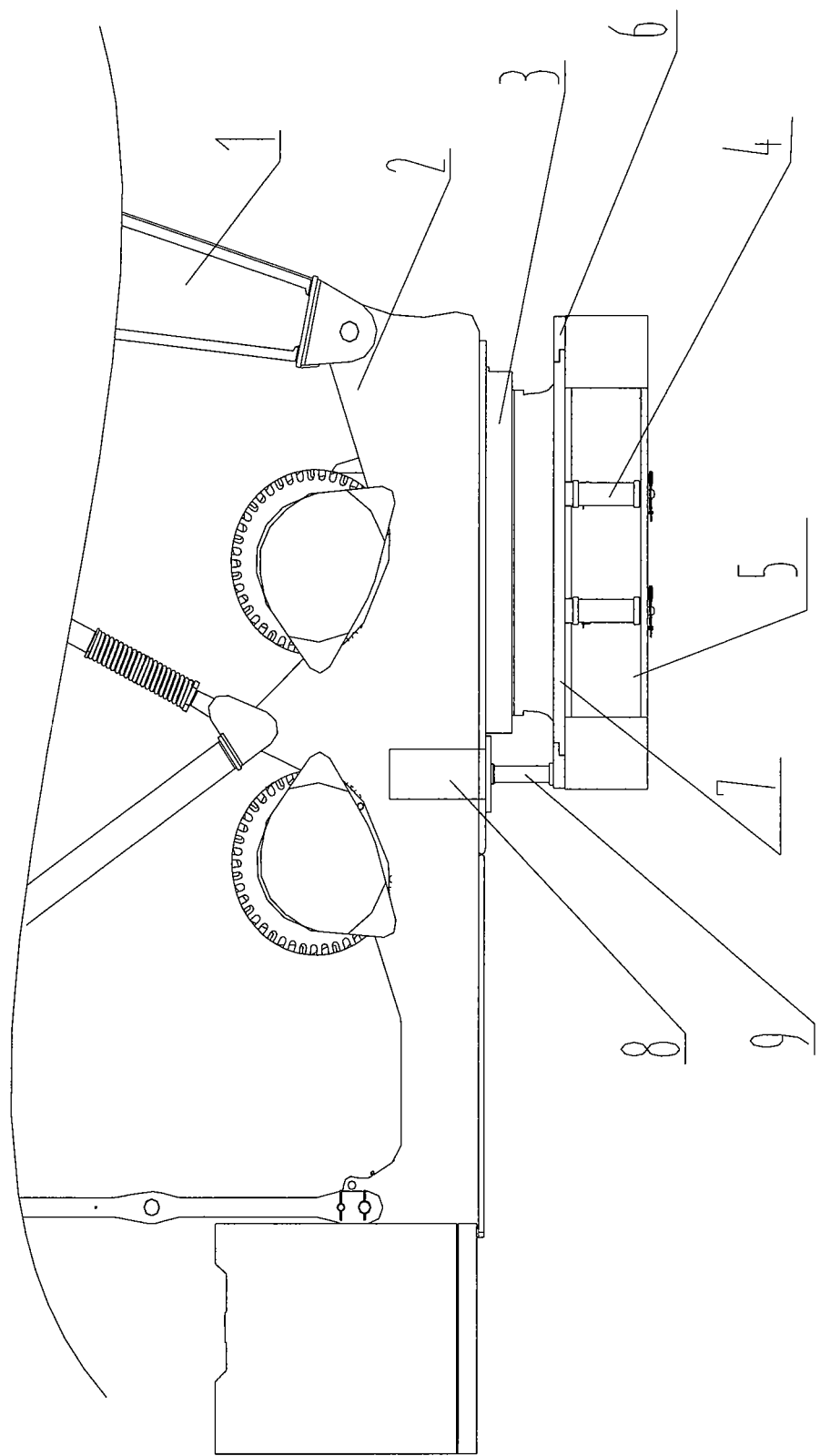
FIG. 1 shows side view of the buffer unit for the slewing platform of the tamping machine of the present utility model.
Figure 2:
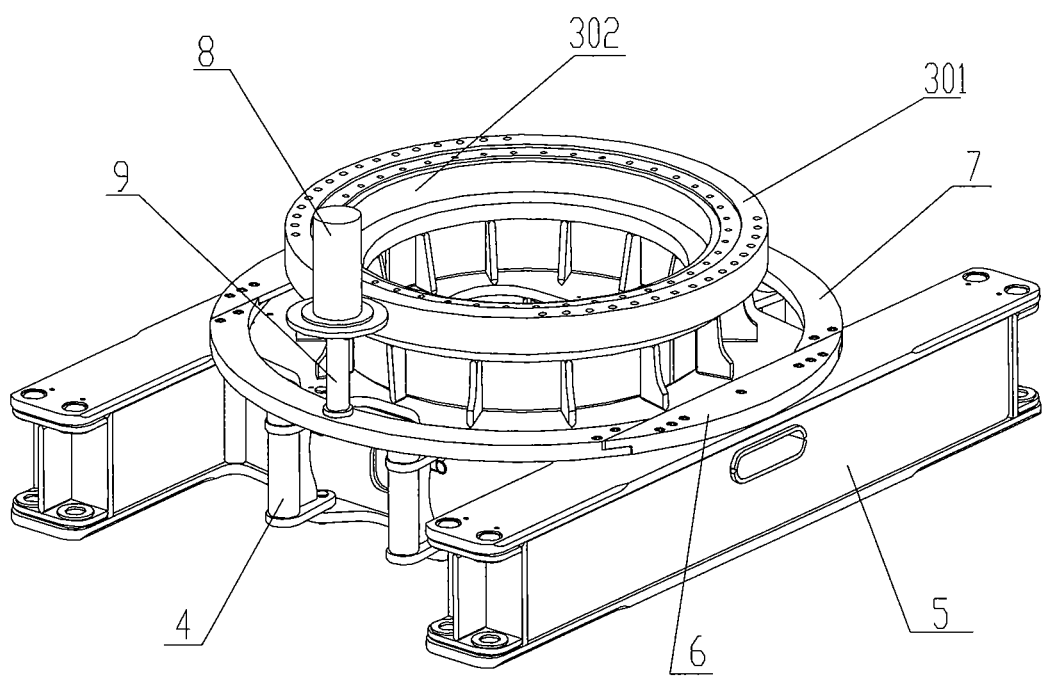
FIG. 2 shows space diagram of the buffer unit for the slewing platform of the tamping machine, wherein the platform is not showed.

FIG. 1 and FIG. 2 shows the structure diagram of the buffer unit for the slewing platform of the tamping machine of the present utility model. In detail, the said buffer unit for the slewing platform of the tamping machine comprising the slewing bearing 3, the leg 4, the chassis 5, the annular supporting slab, the hydraulic cylinder 8 and the connecting rod 9.

The arm support 1 hinges with the slewing platform 2, the slewing bearing 3 comprises the outboard wheel 301 and inboard wheel 302, the outboard wheel 301 and the inboard wheel 302 has several mounting holes for fixing the connecting piece of the slewing bearing 3, the outboard wheel 301 is fixed on the mounting hole by bolt to connect with the slewing platform 2, the inboard wheel 302 is fixed on the mounting hole by bolt to connect to the chassis 5, so the slewing platform 2 could revolve around the chassis 5 to rotation 360 degree.

The annular supporting slab is positioned around the chassis 5, and is fixed on the chassis 5 by bolt and centers around the slewing bearing 3, the said leg 4 fitted on the chassis 5 by bolt, the other end of the said leg supports the annular supporting slab. The hydraulic cylinder 8 fitted on the rear end of the central plane of platform, the piston rod head of the hydraulic cylinder 8 connects to the said connecting rod 9. The difference in height between the said platform 2 and the said chassis 5 meet the requirements that the said connecting rod 9 touches and supports the annular supporting slab at any point of direction of 360 degree rotation when the hydraulic cylinder 8 extends.

Moreover, referring to the space diagram of FIG. 2, the said annular supporting slab comprises two retaining plates 6 and two active plates 7. The chassis 5 comprising the "H" shaped bracket, the said two retaining plates 6 are separately fixed on two brackets of the said chassis 5, the said two active plates 7 are separately fitted between two brackets of the said chassis, the said two retaining plates 6 and the said two active plates 7 are distributed in circular form. Moreover, the width of the said retaining plates 6 equal to the width of the said active plates 7, so that the connecting rod 9 could support at any position of the retaining plates 6 or the active plates 7.

There is a groove forms on the internal surface of the said retaining plate 6 to form guide rail with two legs of the chassis 5, and the said intern surface touches the chassis 5. The two side of the said active plate 7 is made into flange to fit the groove, so that the active plate 7 could extend in the guide surface to adjust the position to change the radius of the retaining plates.

When the tamping machine is running, the pounder of the tamping machine (not shows in figure) falls down, thus generating rebound to the arm support 1, and the hydraulic cylinder 8 provides load shedding effect, the connecting rod 9, which connects to the piston head, support the annular supporting slab when the hydraulic cylinder 8 extends, provides buffer for the slewing platform 2 of the tamping machine, to protect the slewing bearing.

When the tamping machine carries on platform revolution working, the piston of the hydraulic cylinder 8 takes back automatically to maintain the balance of pressure between the internal and external, the connecting rod 9 which connects to the piston raises with the piston and break away from the annular supporting slab to make the said slewing platform avoid the limitation when it carries on platform revolution working.

When the slewing platform switches to a working position and begins to tamp, the piston of the hydraulic cylinder 8 pushes the connecting rod 9 to support the annular supporting slab at another position, so that the buffer unit for the slewing platform of the tamping machine could act as a buffer at any position of 360 degrees.

Figure 3:
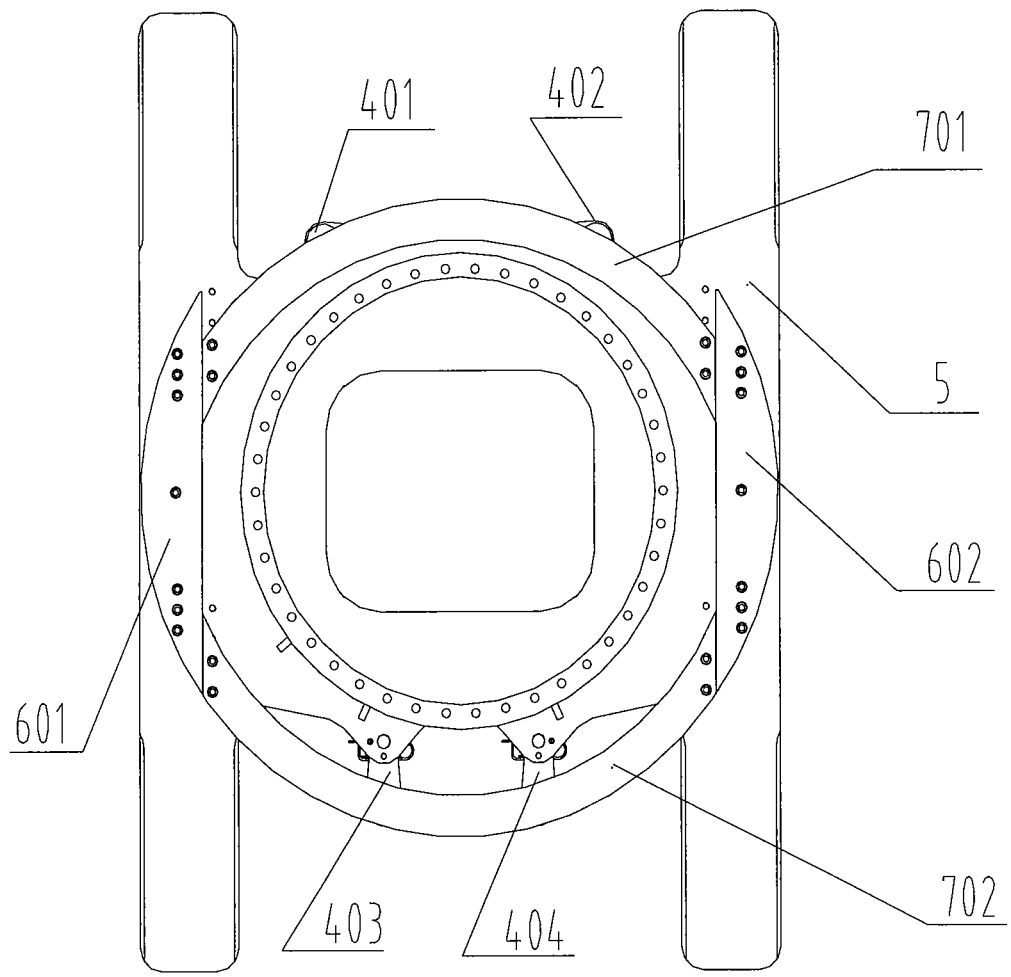
FIG. 3 shows top view of support part of the buffer unit for the slewing platform of the tamping machine.

FIG. 3 shows top view of the buffer unit for the slewing platform of the tamping machine. The buffer unit comprises the chassis 5, the left retaining plate 601, the right retaining plate 602, the forward active plate 701, the backward active plate 702 and the legs 401, 402, 403, 404 in detail, wherein the said four legs is fitted on the chassis 5 by the hinge pin under the mounting position of the active plate.

The two "H" shaped brackets of the chassis 5 have two rows of mounting holes, the said left retaining plate 601 and right retaining plate 602 are fitted on the two outboard mounting holes by bolt, make the retaining plate fixed on the chassis 5, two ends of the forward active plate 701 and backward active plate 702 both have through-holes, the chassis 5 has 4 vertical mounting holes for selecting the mounting position of the active plate. The forward active plate 701 is fitted on the inside position close to the chassis 5 by bolts, the backward active plate 702 is fitted on the outermost mounting hole by bolts, and form half ring with the retaining plate 601 and 602.

As show in FIG. 3, the legs 401, 402 support the forward active plate 701, and the legs 403, 404 support the backward active plate 702. Accordingly, the legs 401,402 fix and revolve around the bracket of chassis 5 by 90 degree by hinge pin, to ensure it could touch the said forward active plate 701, the legs 403, 404 keep parallel with the bracket of the chassis 5 to support the backward active plate 702, which far away from the centre of chassis 5.

In the embodiment as shown in FIG. 3, there are three different mounting positions of the forward active plate and the backward active plate, accordingly, four legs select different rotation degree to fix according to different position of the active plate, preferably, the direction of the rotation of the legs towards to the bracket of the chassis 5.

In another embodiment, different amounts of mounting holes are processed in the chassis 5 to provide the forward active plate 701 and the backward active plate 702 a bigger or smaller adjustable scope.

In another embodiment, the said left retaining plate 601 and right retaining plate 602 is fixed on the chassis 5 by weld.

When carry out the embodiment, we should adjust the position of the active plate and legs, to ensure the connecting rod of the buffer unit for the slewing platform of the tamping machine could support on the platform effectively.

It will be apparent that obvious variations or modifications which are in accordance with the spirit of the invention and which are intended to be part of the invention may be made, and any such obvious variations or modifications are therefore within the scope of the invention. Although the invention is described above with reference to specific embodiments, it will be appreciated by the skilled in the art that it is not limited to those embodiments, but may be embodied in many other forms within the scope of the claims.

The invention claimed is:

1. A buffer unit for a slewing platform of a tamping machine, comprising a slewing bearing and a chassis, an upper end of the said slewing bearing connects to the slewing platform and a lower end of said slewing bearing connects to the chassis, wherein, the slewing platform further comprises an annular supporting slab, a hydraulic cylinder and a connecting rod, the annular supporting slab is fixed on the chassis, the hydraulic cylinder is fitted on a rear end of a central plane of the slewing platform, a piston rod head of the hydraulic cylinder connects to said connecting rod.

2. A buffer unit for the slewing platform of the tamping machine as claimed in claim 1, wherein, the slewing platform and the chassis have a difference in height so that the connecting rod touches and supports the annular supporting slab at any point of direction of 360 degrees rotation when the hydraulic cylinder extends.

3. A buffer unit for the slewing platform of the tamping machine as claimed in claim 1, wherein, the annular supporting slab is an annular metal plate, a width of the annular metal plate is longer than a length of a diameter of the connecting rod.

4. A buffer unit for the slewing platform of the tamping machine as claimed in claim 3, wherein, the chassis comprises a "H" shaped bracket, the annular supporting slab comprises two retaining plates separately fixed on two brackets of said chassis and two active plates separately fitted between the two brackets of the chassis, the two retaining plates and two active plates are distributed in circular form.

5. A buffer unit for the slewing platform of the tamping machine as claimed in claim 4, wherein, a width of at least one of said two retaining plates is equal to a width of at least one of said two active plates.

6. A buffer unit for the slewing platform of the tamping machine as claimed in claim 4, wherein, a groove forms on an internal surface of at least one of said two retaining plates, which forms a guide rail with two legs of the chassis, and an internal surface of at least one of said two retaining plates touches the chassis, the two sides of at least one of the two active plates has flanges that adapt to the groove.

7. A buffer unit for the slewing platform of the tamping machine as claimed in claim 5, wherein, the two active plates are supported by four legs, each of the four legs connects to the chassis with a hinge pin.

8. A buffer unit for the slewing platform of the tamping machine as claimed in claim 4, wherein, the chassis comprises mounting holes, bolts which connect to at least one of the two active plates and said chassis are selectively fixed in different mounting holes.

9. A buffer unit for the slewing platform of the tamping machine as claimed in claim 5, wherein, a groove forms on an internal surface of at least one of said two retaining plates, which forms a guide rail with two legs of the chassis, and an internal surface of at least one of said two retaining plates touches the chassis, the two sides of at least one of the two active plates has flanges that adapt to the groove.

10. A buffer unit for the slewing platform of the tamping machine as claimed in claim 7, wherein, each of the four legs revolve around the hinge pin.

11. A buffer unit for the slewing platform of the tamping machine as claimed in claim 2, wherein, the annular supporting slab is an annular metal plate, a width of the annular metal plate is longer than a length of a diameter of the connecting rod.

12. A buffer unit for the slewing platform of the tamping machine as claimed in claim 11, wherein, the chassis comprises a "H" shaped bracket, the annular supporting slab comprises two retaining plates separately fixed on two brackets of said chassis and two active plates separately fitted between the two brackets of the chassis, the two retaining plates and two active plates are distributed in circular form.

13. A buffer unit for the slewing platform of the tamping machine as claimed in claim 12, wherein, a width of at least one of said two retaining plates is equal to a width of at least one of said two active plates.

14. A buffer unit for the slewing platform of the tamping machine as claimed in claim 12, wherein, a groove forms on an internal surface of at least one of said two retaining plates, which forms a guide rail with two legs of the chassis, and an internal surface of at least one of said two retaining plates touches the chassis, the two sides of at least one of the two active plates has flanges that adapt to the groove.

15. A buffer unit for the slewing platform of the tamping machine as claimed in claim 14, wherein, the two active plates are supported by four legs, each of the four legs connects to the chassis with a hinge pin.

\* \* \* \* \*